May 17, 1966   I. K. DORTORT   3,252,079
SATURABLE REACTOR REGULATING SYSTEM
Filed Jan. 16, 1962   2 Sheets-Sheet 1
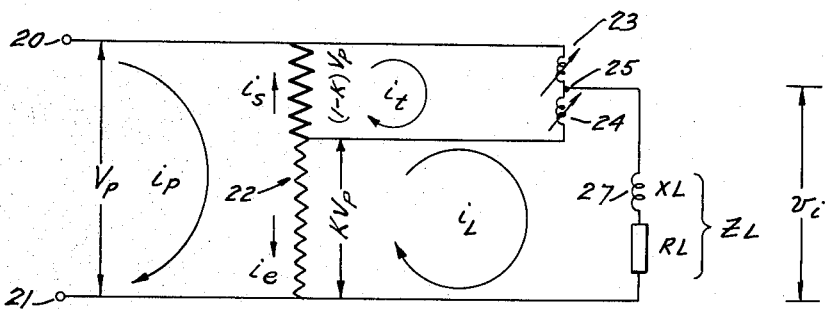
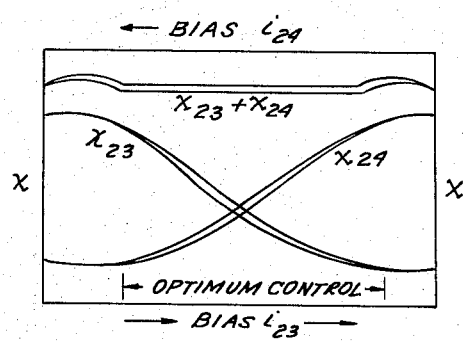
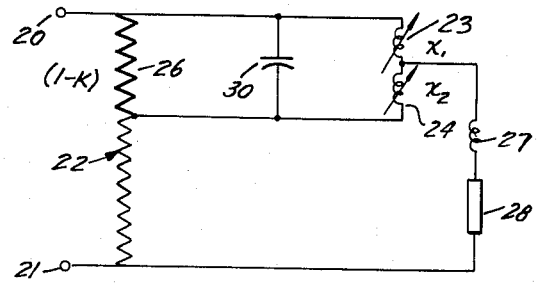
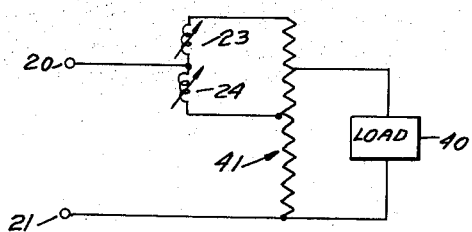
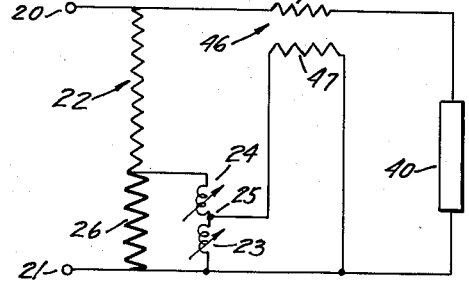
INVENTOR.
ISADORE K. DORTORT
BY
OSTROLENK, FABER, GERB & SOFFEN
ATTORNEYS May 17, 1966  I. K. DORTORT  3,252,079
SATURABLE REACTOR REGULATING SYSTEM
Filed Jan. 16, 1962  2 Sheets-Sheet 2

INVENTOR.
ISADORE K. DORTORT
BY
OSTROLENK, FABER, GERB & SOFFEN
ATTORNEYS

United States Patent Office 3,252,079
Patented May 17, 1966

3,252,079
SATURABLE REACTOR REGULATING SYSTEM
Isadore K. Dortort, Philadelphia, Pa., assignor to I-T-E Circuit Breaker Company, Philadelphia, Pa., a corporation of Pennsylvania
Filed Jan. 16, 1962, Ser. No. 166,602
5 Claims. (Cl. 323—45)

My invention relates to a novel regulating system and more specifically relates to a saturable reactor regulating system where two saturable reactors operate in a manner analogous to a potentiometer.

The use of saturable reactors for regulating purposes is well-known to the art. It can be demonstrated and is well-known to the art that several disadvantages exist in the use of saturable reactors for this purpose. By way of example, and in the simple series saturable reactor serious power factor problems exist. Moreover, and during short circuit conditions the full line voltage will appear across the reactors so that it must be designed to withstand this voltage for the time required by protective equipment to function. Moreover, at light load, full line voltage appears across the load regardless of setting.

Other disadvantages lie in bulkiness, high cost and harmonic distortions produced by the reactor when used in the standard manner.

The present invention provides a novel saturable reactor construction for regulating output voltage or current of a line which includes the series connection of a first and second saturable reactor wherein one connection to the output circuit is taken from the junction between the two reactors.

By appropriately controlling the reactance of the reactors, the potential at this junction can be made to vary over any desired range so that the output voltage to the output load can be easily controlled.

With the reactors driven in this manner and, for example, by connecting them to a tap section of a winding which couples the input and output circuits the same resulting operation will occur as with the use of the usual series reactor or combined series reactor and autotransformer. However, there will now be a considerable saving in the expense of the reactor since it will be considerably smaller. The power factor of the system will be considerably increased and harmonic distortion will not be as severe.

Accordingly, a primary object of this invention is to provide a novel saturable reactor regulator system.

Another object of this invention is to provide a novel saturable reactor relating means which operates in the fashion of a potentiometer.

A further object of this invention is to provide a novel low cost saturable reactor regulator system.

A further object of this invention is to provide a novel regulator system using a pair of saturable reactors connected across a tap section of a coupling transformer which provides improved regulation characteristics.

These and other objects of my invention will become apparent from the following description when taken in connection with the drawings, in which:

FIGURE 1 is an electrical circuit diagram which illustrates the manner in which saturable reactors operate in a fashion of a potentiometer for purposes of regulation in accordance with the present invention.

FIGURE 2 graphically represents the change in impedance as a function of bias for the two reactors of FIGURE 1 in accordance with the invention.

FIGURE 3 illustrates the use of a capacitor connected across the reactors to improve the power factor of the system.

FIGURE 4 illustrates the manner in which the system can be connected in a variable voltage input line to regulate the output voltage or current to a load.

FIGURE 5 illustrates the manner in which the novel saturable reactor potentiometer system of the invention can be used with a series transformer so that the reactors can be held near ground potential.

Figure 6:
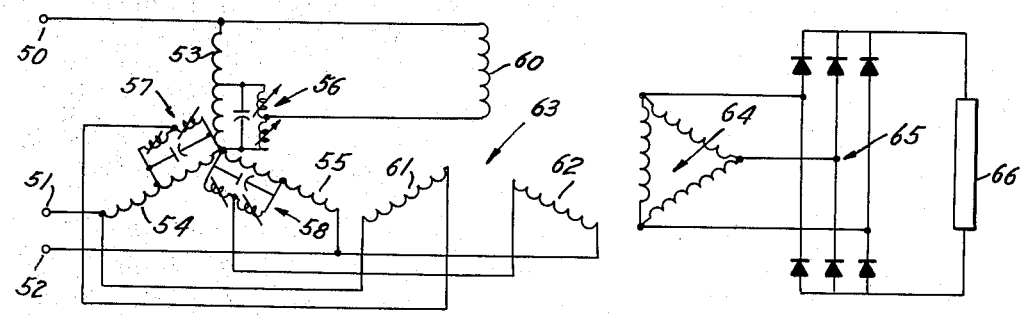
FIGURE 6 is a schematic diagram to illustrate the manner in which the novel regulation system is useful in a rectifier system.

Referring first to FIGURE 1, I have illustrated therein an input A.-C. circuit which is connectable to an A.-C. source at terminals 20 and 21 which are in series with an autotransformer 22. It is to be noted that the autotransformer 22 could be replaced by the usual two windings transformer. A first and second saturable reactor 23 and 24 are then connected to one another at junction point 25 with the series connection being connected across tap portion 26 of autotransformer 22. The junction 25 is then connected in series with a load schematically illustrated as having an inductive portion 27 and resistive portion 28 which has its other terminal connected to the bottom of autotransformer winding 22. Thus, the autotransformer 22 serves as a coupling transformer to couple the input circuit to a load circuit.

In operation of the circuit of FIGURE 1, a primary current $i_p$ flows through autotransformer 22 in the direction illustrated by the arrow. A circulating current $i_t$ flows around tap portion 26 and reactors 23 and 24 as illustrated while a load current $i_L$ flows through the inductive load as is also illustrated by the arrow whereby a voltage $v_L$ appears across the load for a given input voltage $v_p$ connected to terminals 20 and 21, and the biases of reactors 23 and 24. The autotransformer series and excitation winding currents $i_s$ and $i_e$ are the differences $i_p-i_t$ and $i_p-i_L$ respectively. The values of the various currents are determined by the usual mesh equations and the ampere-turn balance of the series and excitation windings.

The saturable reactors 23 and 24 are constructed in any of the well-known manners whereby the impedance of the reactors can be altered by the application of a bias current. The adjustable impedance of the reactors 23 and 24 is symbolically illustrated in FIGURE 1 by the arrows which cross the reactors.

The characteristics of reactors 23 and 24 are illustrated in FIGURE 2 which plots bias current $i_{23}$ for reactor 23 on the lower horizontal scale, bias current $i_{24}$ on the upper horizontal scale and reactor impedance on the vertical scale. The curve $X_{23}$ then illustrates the manner in which the impedance of a reactor 23 varies with bias current $i_{23}$ and is a similar manner the curve $X_{24}$ illustrates the manner in which the reactance of reactor 24 varies with bias current $i_{24}$.

The control curves illustrated in FIGURE 2 are seen to retain a relatively constant total reactance for the two reactors over a relatively large bias range. Thus, a relatively constant loading is applied to the autotransformer by the circulating current $i_t$. However, the potential of point 25 with respect to the bottom of autotransformer 22 will clearly be seen to vary depending upon the particular adjustment of reactors 23 and 24. In this regard, the potential of point 25 varies in the same manner as the tap on a potentiometer.

Moreover, and in the circuit of FIGURE 1, near the upper and lower tap voltages the load voltage $v_L$ is relatively independent of the load impedance while in the intermediate range the voltage can be controlled over a very wide range of load by varying the bias of the individual reactors.

It is to be understood that the variations of the impedance of the individual reactor does not necessarily have to follow the pattern shown in FIGURE 2 where the pattern of FIGURE 2 gives very desirable linear control at light to moderate loads. Thus, the control pattern can be readily modified to obtain different characteristics for various types of loads and purposes.

An analysis of the particular control pattern of FIGURE 2, however, can demonstrate that the power factor of the potentiometer connections as compared to the power factor of a straight series connected control reactor is relatively high. By way of example, such an analysis assuming a resistive load for a ratio $v_L/v_p$ of 80% with the tap section of the autotransformer equal to 20% will give a 95.5 power factor for the potentiometer connection and an 80% power factor for the series connection. When the ratio $v_L/v_p$ increases to 90%, the power factor of the potentiometer connection is of the order of 6% better than that of the series connected reactor.

Moreover, and in comparing the novel potentiometer connection to the usual series connected reactor system, it will be noted that on open circuit, the series system necessarily returns to 100% of the full voltage regardless of the bias on reactors while in a novel potentiometer connected system the open circuit voltage remains at approximately the set voltage.

FIGURE 3 illustrates a modification of FIGURE 1 wherein a power factor correcting capacitor 30 is connected in parallel with winding portion 26 and reactor 23 and 24. The capacitor 30 may be desired since the rating of autotransformer 22 will be increased by the quadrature current $i_t$ circulating through tap section 26 and reactors 23 and 24. A portion of this current will also flow in the line so as to reduce the power factor of the system under all modes of operation. By connecting capacitor 30 across tap winding as shown in FIGURE 3 and by making $$1/(2\pi fC) = (X_{23} + X_{24})$$

this quadrature current is approximately cancelled in the transformer and in the line so as to reduce the size of autotransformer 22 and improving the overall power factor.

The above embodiment of the invention is typical for regulator use on a relatively constant voltage line. To regulate output voltage or current where the line is highly variable, however, the novel potentiometer type system of the invention can be used to obtain constant voltage at the load by reversing the connection of FIGURE 3 as illustrated in FIGURE 4.

Thus, in FIGURE 4, the line terminals 20 and 21 are for a highly variable line voltage which is applied directly to reactors 23 and 24. By appropriate control of the reactor biases, a relatively constant voltage will be delivered to load 40 which is coupled to the line by the coupling transformer 41.

In order to reduce the insulation requirement of the system, it is further desirable that reactors 23 and 24 of FIGURES 3 and 4 be at or near ground potential. In an embodiment where the line and load are both grounded, it is therefore necessary to provide an isolating transformer. This type of arrangement is illustrated in FIGURE 5, where the terminal 20 is connected at the high potential point of transformer 22 and is connected in series with the primary winding 45 of series transformer 46. The junction point 25 of reactors 23 and 24 is then connected to the secondary winding 47 which is in turn connected to ground whereby both the line and the load will be held at ground and at the same time the reactors are at or near ground potential.

It is to be noted that without the series transformer 46 either the line or the load would vary from ground potential through a total range given by the voltage on tap 26.

FIGURE 6 illustrates the manner in which the novel regulator of the invention can be applied to a three phase system as a regulator for a rectifier and rectifier transformer.

Thus, in FIGURE 6 a three phase line is connectable to terminals 50, 51 and 52 which are each connected to the outer ends of regulator windings 53, 54 and 55, respectively where these windings are connected in Y. The regulator transformer serves as a three phase autotransformer wherein its tap winding is provided with the potentiometer type regulating reactor pairs 56, 57 and 58 which operate in conjunction with respective power factors correcting capacitors in the manner shown in FIGURE 3. The regulator windings are then connected to windings 60, 61 and 62 which are the primary windings of rectifier power transformer 63 which has the delta connected secondary winding 64. The secondary winding 64 is then connected to a three phase bridge connected rectifier system 65, which is in turn connected to a D.-C. load 66.

In order to regulate the output voltage of secondary winding 64, it will be apparent that the various double reactors 56, 57 and 58 in each of the regulator phases are controlled as indicated in FIGURE 2 whereby the output voltage applied to primary windings 60, 61 and 62 is appropriately controlled.

It will be noted in FIGURE 6, that all of the reactors are connected at the neutral of the regulator device and utilize the rectifier transformer 63 as an isolating transformer with respect to the neutral.

Obviously, instead of the connection shown in FIGURE 6, the neutral of the regulating transformer can be established by tying together the junction points 25 of the three pairs of reactors, instead of the ends of the phase windings. Then only three leads to the rectifier transformer are required, instead of six, and the primary of the rectifier transformer can then be made a normal Y or delta winding.

Figure 7:
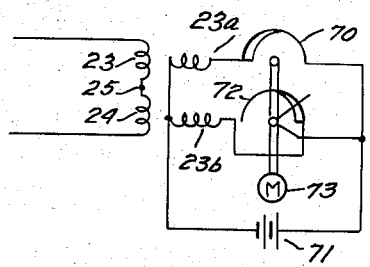
FIGURE 7 shows the connection of a bias supply to the two reactors of the invention in such a manner that the sum of the reactances of the devices will be approximately constant.

FIGURE 7 illustrates one manner in which the double reactor system of the invention can be controlled by use of rheostats which are driven from a servo-motor which operates in response to a signal to retain a constant output voltage.

In FIGURE 7, reactors 23 and 24 are schematically illustrated as having respective biasing windings 23a and 23b. Winding 23a is connected in series with rheostat 70 which is tapered in the direction illustrated so that as the rheostat moves clockwise the change of resistance introduced becomes larger for a given angular motion. The other end of rheostat 70 is then connected in series with a D.-C. power supply 71. Control winding 23b is connected in series with a tapered rheostat 72 which is constructed in a manner identical but tapered diametrically opposite to rheostat 70 and is also connected in series with power supply 71. The rheostats 70 and 72 are driven in the same direction by the same shaft, but because of the opposite connections and opposite taper, the resistance of rheostat 72 increases while the resistance of rheostat 70 decreases and vice versa. The rheostats, tandem mounted, can be operated manually, or, if desired, can be driven from a servo-motor 73 which will position rheostats 70 and 72 so that the bias current similar to that of FIGURE 2 will be generated in bias windings 23a and 23b, whereby the reactance of reactors 23 and 24 will vary as illustrated in FIGURE 2.

While the control scheme of FIGURE 7 requires the mechanically controlled rheostats, it will be obvious that a static regulating means may supply this bias. By way of example, magnetic amplifiers may be used to supply the bias for the reactors 23 and 24. Thus, a first magnetic amplifier can be connected to the bias winding 23 and a second magnetic amplifier can be connected to the bias winding 23b wherein, for a common input signal to the two magnetic amplifiers, the first will have a decreasing output current while the second will have an increasing output current.

In the foregoing, reactance control was by virtue of the control of the bias to a saturable reactor. Clearly, however, this control could be carried out as by controlling an air gap in the reactors, or by any other desired manner.

Although I have described preferred embodiments of my novel invention, many variations and modifications will now be obvious to those skilled in the art, and I prefer therefore to be limited not by the specific disclosure herein, but only by the appended claims.

The embodiments of the invention in which an exclusive privilege or property is claimed are defined as follows:

1. A regulator system comprising a first circuit, a second circuit, a first reactor means and a second reactor means; said first and second reactor means having adjustable impedance; a first and second control means for said first and second reactors; said first and second control means being operable to control the impedance of said first and second reactors respectively; said first and second reactors being connected in series with said first circuit; said second circuit being connected in series with one of said reactors; the potential at the junction between said first and second reactors receiving one terminal of said second circuit being adjusted by adjustment of the impedance of said first and second reactors; said first and second control means being operable to increase the reactance of said first reactor while decreasing the reactance of said second reactor; the total reactance of said first and second reactors being relatively constant.

2. A regulator system comprising a first circuit, a second circuit, a first reactor means and a second reactor means; said first and second reactor means having adjustable impedance; a first and second control means for said first and second reactors; said first and second control means being operable to control the impedance of said first and second reactors respectively; said first and second reactors being connected in series with said first circuit; said second circuit being connected in series with one of said reactors; the potential at the junction between said first and second reactors receiving one terminal of said second circuit being adjusted by adjustment of the impedance of said first and second reactors; said first and second reactors comprising saturable type reactors; said first and second control means including bias windings on said first and second reactors; said first and second control means being operable to increase the reactance of said first reactor while decreasing the reactance of said second reactor; the total reactance of said first and second reactors being relatively constant.

3. A regulator system comprising a transformer, and a first and second reactor; said first and second reactors being connected in closed series connection with at least a portion of a winding of said transformer; said first and second reactors having an adjustable impedance; the potential at the junction between said first and second reactors varying in accordance with the impedance of said first and second reactors at a given time and a control means for controlling the reactance of said first and second reactors; said control means being operable to increase the reactance of either of said first or second reactors while decreasing the reactance of the other of said first or second reactors; and a power factor correcting capacitor; said power factor correcting capacitor being connected in parallel with said series connected first and second reactors; and a load; said load connected from said junction between said first and second reactors to one end of said transformer.

4. A regulator system comprising a transformer, and a first and second reactor; said first and second reactors being connected in closed series connection with at least a portion of a winding of said transformer; said first and second reactors having an adjustable impedance; the potential at the junction between said first and second reactors varying in accordance with the impedance of said first and second reactors at a given time and a control means for controlling the reactance of said first and second reactors; said control means being operable to increase the reactance of either of said first or second reactors while decreasing the reactance of the other of said first or second reactors; the total reactance of said first and second reactors remaining relatively constant; and a load; said load connected from said junction between said first and second reactors to one end of said transformer.

5. A regulator system comprising a transformer, and a first and second reactor; said first and second reactors being connected in closed series connection with at least a portion of a winding of said transformer; said first and second reactors having an adjustable impedance; the potential at the junction between said first and second reactors varying in accordance with the impedance of said first and second reactors at a given time and a control means for controlling the reactance of said first and second reactors; said control means being operable to increase the reactance of either of said first or second reactors while decreasing the reactance of the other of said first or second reactors; the total reactance of said first and second reactors remaining relatively constant; and a power factor correcting capacitor; said power factor correcting capacitor being connected in parallel with said series connected first and second reactors; and a load; said load connected from said junction between said first and second reactors to one end of said transformer.

References Cited by the Examiner

UNITED STATES PATENTS

| | | | |
|---|---|---|---|
| 2,358,394 | 9/1944 | Haug | 323—8 |
| 2,547,615 | 4/1951 | Bedford | 323—89 |
| 3,041,523 | 6/1962 | Kuba | 323—76 |

LLOYD McCOLLUM, *Primary Examiner.*